Nov. 18, 1941.　　　D. L. WOOD　　　2,263,024
LENS MOUNT
Filed April 27, 1940
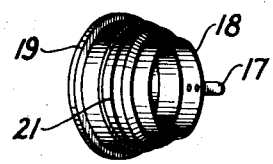
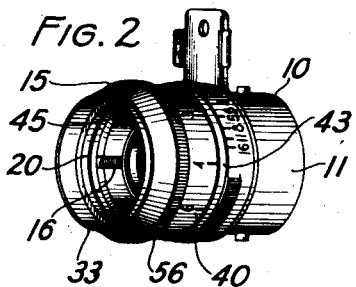
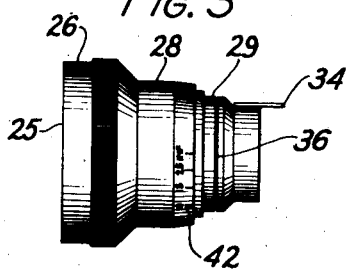
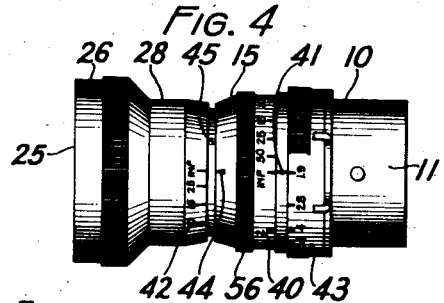
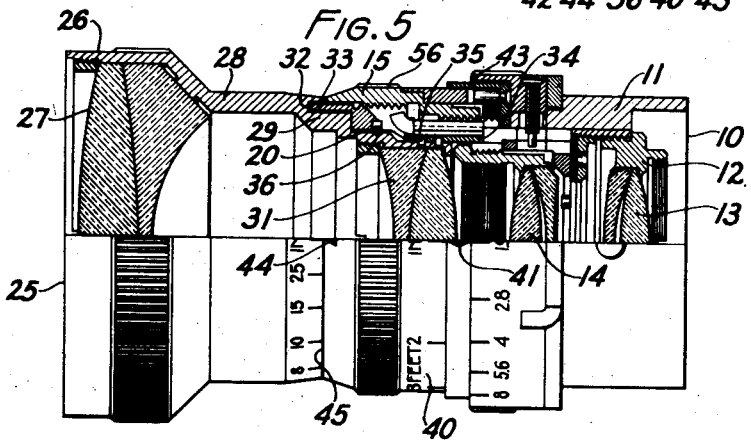
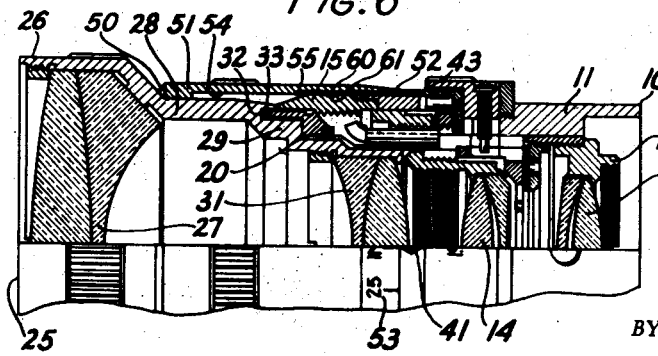
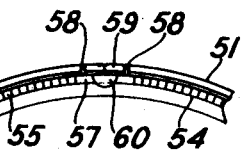
DONALD L. WOOD
INVENTOR
BY *[signatures]*
ATTORNEYS Patented Nov. 18, 1941

2,263,024

UNITED STATES PATENT OFFICE 2,263,024

LENS MOUNT

Donald L. Wood, Rochester, N. Y., assignor to Eastman Kodak Company, Rochester, N. Y., a corporation of New Jersey Application April 27, 1940, Serial No. 332,036

8 Claims. (Cl. 88—57)

The present invention relates to lens mounts, and more particularly to lens mounts adapted to receive detachable supplementary lens attachments.

Accessory wide angle and telephoto attachments for use with camera objectives are usually placed in focusing mounts because the focus scale on the regular objective is no longer correct with the attachment in place. When such attachments are used, focusing is usually secured by adjusting the front lens element only of the attachment, the other lens element of the attachment as well as the lens elements of the objective remaining stationary. With such a method of focusing, the spacing of the lens elements of the attachments is varied, thus causing distortion and other aberrations well known to those in the art. This method of focusing, although unsatisfactory, has been extensively used because it was simple, and because no other practical method was known.

The present invention has as its principal object, the provision of an arrangement by which focusing is secured without any variation in the spacing of the various lens elements of the supplementary lens attachment.

Another object of the invention is the provision of an arrangement by which the moving means of the objective lens element is rendered effective to also move the supplementary lens attachment substantially as a unit therewith so as to focus all the lenses as a unit without materially changing the spacing thereof.

Still another object of the invention is the provision of a supplementary lens attachment which is provided with a suitable scale, which, when the attachment is secured to the camera objective, cooperates with a suitable pointer on the camera objective to afford a new focusing scale for the entire lens system. When, however, the attachment is removed, the regular focusing scale on the objective is then used to focus the lenses thereof.

A further object of the invention is the provision of a focusing scale construction which is simple in design, inexpensive to manufacture, easy to operate, and highly effective in use.

To these and other ends, the invention resides in certain improvements and combinations of parts, all as will be hereinafter more fully described, the novel features being pointed out in the claims at the end of the specification.

In the drawing:

Fig. 1 is a perspective view of a masking device commonly used in connection with Cine objective lenses;

Fig. 2 is a perspective view of a Cine objective lens of well-known construction;

Fig. 3 is a side view of a supplementary lens attachment constructed in accordance with the present invention;

Fig. 4 is a side view of the objective lens as shown in Fig. 2 with a supplementary lens detachably secured in position thereon;

Fig. 5 is a view similar to Fig. 4, but on a larger scale than the latter, with parts in section to show the method of maintaining the attachment on the objective and for securing the focusing adjustment;

Fig. 6 is a view similar to Fig. 5 but showing a modified arrangement of a focusing scale on the supplementary lens attachment; and Fig. 7 is a fragmentary end view of the focusing scale ring illustrated in Fig. 6, and showing the arrangement by which the scale ring, and hence the supplementary lens attachment, may be detachably secured to the objective mount.

Similar reference numerals through the various views indicate the same parts.

The drawing shows a Cine objective lens mount 10 of any suitable and well-known construction which comprises an outer cylindrical tube 11 adapted to be attached to a camera, in a well-known manner. A lens barrel 12 is non-rotatably but axially movable in the tube 11 and carries a pair of spaced lens elements 13 and 14 which are fixed in position on the lens barrel. A focusing ring 15 is rotatably mounted on the tube 11 and is connected to the barrel 12, in any suitable and well-known manner, so that the rotation of the ring serves to move the lens barrel axially along the tube 11 to focus the lens elements 13 and 14 without varying the spacing therebetween, all of which is well known to those in the art.

The lens barrel 12 is formed with an axially extending slot 16 arranged to receive a tongue 17 secured to a sleeve 18 of a masking device 19 to detachably secure the latter to the front of the lens barrel. The front of the masking device is formed with a rectangular masking aperture, not shown. When the masking device is in position, the sleeve 18 is slid into and engages the inner surface of the barrel 12 and is held in place thereon by a circular spring 20 which engages in a circumferential groove 21 in the masking device to retain the latter in position on the objective mount. The above-described objective lens mount with the detachable masking device, may be of any standard or well-known construction and does not per se constitute a part of the present invention. A further detailed discussion is, therefore, not deemed necessary for those in the art to fully understand the present invention.

A supplementary lens attachment, generally indicated by the numeral 25 and of the shape best shown in Fig. 5, is adapted to be detachably secured to the objective mount 10 in a manner to be later described. This attachment is tubular in shape and comprises a cylindrical front end portion 26 in which is mounted the front lens element 27, an intermediate portion 28, and a rear portion 29 which is shaped to conform with and to preferably frictionally engage the inner surface of the lens barrel 12, as clearly shown in Fig. 5. This rear portion 29 has mounted therein a rear lens element 31. The lens elements 27 and 31 are thus fixed in spaced relation in the attachment 25, the purpose of which construction will be later pointed out. The rear end of the intermediate portion 28 is formed with a circumferential groove or slot 32 adapted to receive the front end 33 of the lens barrel, as clearly shown in Fig. 5. A rearwardly extending tongue 34 is secured to the outer surface of the portion 29 by rivets 35, or other suitable fastening means.

In assembling the attachment, the tongue 34 thereof is first brought into registry with the slot 16, and the attachment and the objective 10 are then moved axially toward each other to position the tongue in the slot and to slide the rear portion 29 of the attachment into the front end of the lens barrel, as will be apparent from an inspection of Figs. 4 and 5. When the attachment is in proper position, the spring 20 in the lens barrel then registers with and automatically snaps into a groove 36 formed in the attachment, as shown in Fig. 5, to positively connect the attachment to the lens barrel. It is now apparent that the lens barrel 12 and the attachment 25 constitute a single unit which will move axially but not rotatably of the objective 10 upon rotation of the focusing ring 15 to focus the entire lens systems 13, 14, 27, and 31. It is also apparent that such focusing is secured by moving all the lens elements as a unit without variation in the spacing therebetween, particularly the elements 27 and 31. Such a method of focusing eliminates distortion and various other aberrations which result in focusing by the lens separation of the lens elements of the supplementary lens attachment.

When the objective 10 alone is used, the desired focusing is secured by rotating the focusing ring 15 to bring the desired portions of the scale 40 thereon into alignment with a fixed pointer 41 formed on a stationary ring 43 suitably secured to the tube 11, as is well known. As the scale is, of course, designed only for the lenses 13 and 14, obviously this scale is no longer correct for one resulting focal length when the attachment 25 is in position, as shown in Figs. 4, 5, and 6. Obviously, therefore, a new focusing scale must be provided for the combined lens elements of the objective 10 and the attachment 25. If only a single attachment is to be used, a second auxiliary scale could be provided on the objective itself, this second scale being employed only when the attachment 25 is utilized. However, such a double scale on the objective would be undesirable, for obvious reasons. Furthermore if a number of different attachments were used, a separate scale would be required for each attachment. Such a multiplicity of auxiliary scales would certainly tend to lead to confusion on the part of the user.

To overcome these difficulties, the present invention provides an arrangement by which the various auxiliary focusing scales are formed on the separate attachment 25 rather than on the objective 10, the advantages of which will be apparent. To this end, each attachment has printed, etched, marked, or otherwise formed thereon a scale 42 which, when the attachment is secured in position, is arranged adjacent a pointer 44 formed on the focusing ring 15 adjacent the front end 45 thereof, as clearly illustrated in Fig. 4. Thus a separate scale may be provided for each attachment, each scale being, of course, designed for the combined lens system of the particular attachment 25 and the objective 10. By means of this arrangement, a large number of separate attachments may be selectively and interchangeably used with the camera objective 10. As mentioned above, rotation of the ring 15 moves the lens barrel 12 and the attachment 25 as a unit to secure the focusing. Such rotation of the ring serves to move the pointer 44 thereon over the non-rotatable but axially movable scale 42 on the attachment to indicate the proper focusing adjustment.

It is apparent from an inspection of Fig. 4, that when the attachment 25 is connected to the objective 10, both the focusing scales 40 and 42 are visible. Obviously when the attachment is in place, focusing is accomplished by means of the latter scale only. However, in order to eliminate any chance of error, the present invention also provides a modified arrangement by which a scale 40 of the objective 10 is completely covered when the attachment 25 is connected thereto so that only the correct focusing scale will be visible. This modified structure is shown in Figs. 6 and 7. Parts corresponding to those in Figs. 1 to 5 will be designated by the same numerals. In order to cover the objective focusing scale 40, the attachment 25 has permanently secured to the outer surface thereof at 50, a cylindrical scale sleeve 51 which overlies and is spaced from the intermediate and rear portions 28 and 29 of the attachment 25, as clearly shown in Fig. 6. When the attachment is secured to the objective 10, the sleeve 51 extends over and completely covers the focusing ring 15 and the scale 40 and has the end 52 thereof terminating adjacent the stationary ring 43 which carries the fixed pointer 41, as shown in Fig. 6. This sleeve 51 has suitably formed thereon a focusing scale 53 which is adapted to cooperate with the fixed pointer 41 in a manner to be later described. It is to be understood, that the scale 53 is designed for the combined lens system of the objective and the attachment, and not merely for the latter, so that by bringing the proper indication of the scale 53 into registry with the pointer 41, the complete mount will be in proper focus.

As the sleeve 51 covers the focusing ring 15, obviously the latter cannot now be directly rotated to focus the mount. In this embodiment, the sleeve 51 is utilized to impart the necessary rotative movement to the ring 15. To secure this result, the inner surface 54 of the sleeve 51 is formed with a plurality of longitudinally extending lugs or ridges 55 which are adapted to engage and cooperate with similarly shaped knurlings 56 formed on the outer surface of the ring 15, see Fig. 4. By means of this arrangement, a spline connection is provided between the sleeve 51 and the ring 15. This connection not only permits the sleeve 51 to be slid into overlying position on the ring 15 but also imparts the necessary turning movement to the ring 15 upon rotation of the sleeve 52. When the latter is slid into position, it is imperative that the scale 53 thereon be in proper relation to the scale 40 of the objective 10, as will be apparent to those in the art.

To this end, the present invention provides an arrangement by which the sleeve 51 can only be mounted when the infinity reading of the scale 53 is in alignment with the infinity reading of the scale 40. To secure this result, the sleeve 51 has a portion 57 in which the lugs 55 are omitted to engage a similarly smooth portion, not shown, on the focusing ring. By means of this simple arrangement, proper positioning of the sleeve 51, and hence the focusing scale 53 is positively insured. In order to retain the scale 53 in proper axial position on the ring 15 the sleeve 51 is provided with pairs of axially extending slits 58 which provide flexible fingers 59 each of which is formed with a depending protuberance 60 adapted to spring over and snap into recesses or grooves 61 formed on the periphery of the ring 15, as clearly shown in Fig. 6.

It is apparent that due to the spline connection 55 and 56, any rotation of the scale sleeve 51 will also rotate the focusing ring 15 to non-rotatably move the lens barrel 12 axially of the tube 11, as pointed out above. However, as the sleeve 51 is connected at 50 to the attachment 25, the latter will also be rotated as a unit therewith. It is well known, however, that due to the threaded engagement of the focusing ring 15 with the tube 11, any rotation of the ring will also cause the latter to move axially relative to the tube 11. This axial movement of the ring 15 will, through the connections 60 and 61, impart the required axial movement to the attachment 25, and will also move the latter axially relative to the lens barrel. This relative axial movement between the lens barrel and the attachment will cause a slight change in the spacing between the lenses 14 and 31, but such change is quite small and is not detrimental, as will be apparent to those in the art. The important point is, that focusing is secured without changing the spacing between the lenses 27 and 31 of the attachment 25, thus effectively overcoming the undesirable results secured in the prior method of focusing in which relative axial movement between the lenses of the attachment was necessary to secure the desired focusing adjustment. As the attachment 25 is both rotated and moved axially relative to the lens barrel 12, the connecting tongue 34 and the spring receiving groove 36 are omitted in this modified embodiment illustrated in Figs. 6 and 7. In addition, the diameter of the rear portion 29 of the attachment 25 is preferably made slightly smaller so as to afford a slight clearance between the portion 29 and the lens barrel 12, as clearly shown in Fig. 6.

As the sleeve 51 is thus rotated, the scale 53 thereon will move over the fixed pointer 41 to clearly indicate the focusing adjustment of the entire mount. However, as the sleeve 51 completely covers the scale 40, the possibility of using the wrong focusing scale is thereby eliminated, the advantages of which will be readily apparent. When, however, the attachment 25 is removed, the sleeve 51 is removed as a unit therewith, and the objective focusing scale 40 is again uncovered and is rendered effective for focusing the lenses 13 and 14 of the objective 10.

It is thus apparent from the above description that the present invention provides an arrangement for focusing without any separation of the lens elements of the supplementary lens attachment. It is also apparent that the attachment is so connected to the lens barrel of the objective that the various lens elements are simultaneously moved to secure the necessary focusing adjustment. In addition, the auxiliary focusing scales are carried by the separate attachments so that a wide range of attachments may be selectively used with the regular objective lens mount.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a lens mount, the combination with a camera objective, a lens barrel formed with an axially extending slot, a plurality of lens elements mounted in proper spaced relation in said barrel, means for moving said barrel axially of said objective, of a supplementary lens attachment, a plurality of lens elements arranged in fixed spaced relation in said attachment, and an axially extending tongue on said attachment arranged to be positioned in said slot to connect said attachment to said barrel so that axial movement of the latter will simultaneously move said attachment as a unit therewith to focus said mount without altering the spacing of said lens elements.

2. In a lens mount, the combination with a camera objective, a lens barrel mounted for axial movement in said objective and formed with an axially extending slot, a plurality of lens elements mounted in fixed spaced relation in said barrel, a focusing ring rotatably mounted on said objective and operatively connected to said barrel for moving the latter axially of said objective, of a supplementary lens attachment, a plurality of lens elements arranged in fixed spaced relation in said attachment, a tubular portion on said attachment arranged to be slid into said barrel, a tongue on said portion arranged to engage said slot to detachably connect said attachment to said barrel and to position said second lens elements relative to said first lens elements so that said barrel and attachment may be moved axially as a unit upon rotation of said ring without varying the spacings between any of said elements, and means on said barrel arranged to engage a complementary section of said portion to retain the latter in position in said barrel.

3. In a lens mount, the combination with a camera objective, a lens barrel mounted for axial movement in said objective and formed with an axially extending slot, a plurality of lens elements mounted in fixed spaced relation in said barrel, a focusing ring rotatably mounted on said objective and operatively connected to said barrel for moving the latter axially of said objective, of a supplementary lens attachment, a plurality of lens elements arranged in fixed spaced relation in said attachment, a sleeve secured to and movable as a unit with said attachment and operatively connected to said ring so that rotation of said sleeve will simultaneously move said barrel and said attachment axially to focus said mount without varying the spacings of said last mentioned elements, and means for positioning and detachably connecting said sleeve on said ring.

4. In a lens mount, the combination with a camera objective, a plurality of lens elements arranged in fixed spaced relation in said objective, means for moving said elements as a unit axially of said objective, of a supplementary lens attachment, a plurality of lens elements arranged in fixed spaced relation in said attachment, cooperating means on said attachment and said objective for operatively connecting said last mentioned elements to and in proper spaced relation with said first mentioned elements whereby the actuation of said moving means serves to axially move all of said elements simultaneously to focus said mount without varying the spacing between said last mentioned elements, and a focusing scale for said mount comprising cooperating elements on said attachment and said objective.

5. In a lens mount, the combination with a camera objective, a lens barrel mounted for axial movement in said objective, a plurality of lens elements arranged in fixed spaced relation in said barrel, means operatively connected to said barrel for moving the latter axially of said objective, of a supplementary lens attachment having a portion thereof positioned in said barrel, a plurality of lens elements arranged in fixed spaced relation in said attachment, means for operatively connecting said attachment to said barrel moving means so that actuation of said moving means will serve to simultaneously move said attachment axially to focus said mount without changing the spacing of said last mentioned elements, and a focusing scale for said mount comprising a scale element carried by said attachment and a pointer carried by said objective and arranged to be positioned adjacent and to cooperate with said scale element.

6. In a lens mount, the combination with a camera objective, a lens barrel formed with an axially extending slot, a plurality of lens elements mounted in proper spaced relation in said barrel, means for moving said barrel axially of said objective, of a supplementary lens attachment, a plurality of lens elements arranged in fixed spaced relation in said attachment, an axially extending tongue on said attachment arranged to be positioned in said slot to connect said attachment to said barrel so that axial movement of the latter will simultaneously move said attachment as a unit therewith to focus said mount without altering the spacing of said lens elements, an axially movable but non-rotatable scale carried by said attachment, and a rotatable pointer carried by said barrel moving means and positioned adjacent and cooperating with said scale to afford a focusing means for said mount.

7. In a lens mount, the combination with a camera objective, a lens barrel mounted for axial movement in said objective and formed with an axially extending slot, a plurality of lens elements mounted in fixed spaced relation in said barrel, a focusing ring rotatably mounted on said objective and operatively connected to said barrel for moving the latter axially of said objective, of a supplementary lens attachment, a plurality of lens elements arranged in fixed spaced relation in said attachment, a sleeve secured to and movable as a unit with said attachment and operatively connected to said ring so that rotation of said sleeve will simultaneously move said barrel and said attachment axially to focus said mount without varying the spacings of said last mentioned elements, means for positioning and detachably connecting said sleeve on said ring, a movable scale element carried by said sleeve, and a stationary pointer carried by said objective and cooperating with said movable scale to afford a focusing means for said mount.

8. In a lens mount, the combination with a camera objective, a lens barrel mounted for axial movement in said objective, a plurality of objective lens elements arranged in fixed spaced relation in said barrel, a focusing ring carried by said objective and operatively connected to said lens barrel and adapted to move the latter axially of said objective upon actuation of said ring to focus said elements, an objective focusing scale carried by said ring, a pointer carried by said objective and adapted to cooperate with said scale to indicate the focusing adjustment of said elements, of a supplementary lens attachment adapted to be detachably secured to said objective, a pair of supplementary lens elements arranged in fixed spaced relation in said attachment, a sleeve operatively secured to said attachment and arranged to overlie said ring and to cover the scale thereon when said attachment is secured to said objective, an auxiliary focusing scale carried by said sleeve and arranged to cooperate with said pointer to indicate the focusing adjustment of said objective and supplementary elements, and cooperating means on said sleeve and said ring for connecting said sleeve to said ring so that rotation of said sleeve will actuate said ring to simultaneously move said attachment and said barrel axially of said objective to focus said elements without any change in the spacing of said supplementary elements.

DONALD L. WOOD.